United States Patent
Cai et al.

(10) Patent No.: US 11,322,155 B2
(45) Date of Patent: May 3, 2022

(54) METHOD AND APPARATUS FOR ESTABLISHING VOICEPRINT MODEL, COMPUTER DEVICE, AND STORAGE MEDIUM

(71) Applicant: PING AN TECHNOLOGY (SHENZHEN) CO., LTD., Guangdong (CN)

(72) Inventors: Yuanzhe Cai, Guangdong (CN); Jianzong Wang, Guangdong (CN); Ning Cheng, Guangdong (CN); Jing Xiao, Guangdong (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 159 days.

(21) Appl. No.: 16/759,384

(22) PCT Filed: Jul. 6, 2018

(86) PCT No.: PCT/CN2018/094888
§ 371 (c)(1),
(2) Date: Apr. 27, 2020

(87) PCT Pub. No.: WO2019/214047
PCT Pub. Date: Nov. 14, 2019

(65) Prior Publication Data
US 2020/0294509 A1    Sep. 17, 2020

(30) Foreign Application Priority Data
May 8, 2018 (CN) .................. 201810433792.X (51) Int. Cl.
*G10L 17/04* (2013.01)
*G06F 17/18* (2006.01)
(Continued)

(52) U.S. Cl.
CPC .............. *G10L 17/04* (2013.01); *G06F 17/18* (2013.01); *G06K 9/6218* (2013.01);
(Continued)

(58) Field of Classification Search
CPC ......... G10L 15/22; G10L 15/16; G10L 15/02; G10L 21/0272; G10L 17/18;
(Continued)

(56) References Cited

U.S. PATENT DOCUMENTS 8,645,137 B2 * 2/2014 Bellegarda .............. G10L 15/07
704/250
2018/0204111 A1 * 7/2018 Zadeh .................. G06N 3/0436
(Continued)

OTHER PUBLICATIONS

Tiwari et al, Hardware Implementation of neural network with sigmoidal activation functions using CORDIC, Microprocessors and Microsystems 39 (2015) pp. 373-381 (Year: 2015).*
(Continued)

*Primary Examiner* — Linda Wong (57) ABSTRACT

A method and apparatus for establishing a voiceprint model, a computer device, and a storage medium are described herein. The method includes: collecting speech acoustic features in a speech signal to form a plurality of cluster structures; calculating an average value and a standard deviation of the plurality of cluster structures and then performing coordinate transformation and activation function calculation to obtain a feature vector; and obtaining a voiceprint model based on the feature vector.

20 Claims, 5 Drawing Sheets

(51) Int. Cl.
*G06K 9/62* (2022.01)
*G06N 3/04* (2006.01)
*G06N 3/08* (2006.01)
*G10L 15/02* (2006.01)
*G10L 15/16* (2006.01)
*G10L 17/02* (2013.01)

(52) U.S. Cl.
CPC ............. *G06N 3/0481* (2013.01); *G06N 3/08* (2013.01); *G10L 15/02* (2013.01); *G10L 15/16* (2013.01); *G10L 17/02* (2013.01)

(58) Field of Classification Search
CPC ....... G10L 15/063; G10L 17/04; G10L 15/20; G10L 17/00; G10L 15/00; G10L 25/30; G10L 15/08; G10L 15/04; G10L 15/144; G10L 19/018; G10L 17/02; G10L 17/20; G06F 21/32; G06F 16/3329; G06F 16/243; G06F 16/35; G06F 16/433; G06F 40/40; G06F 17/18; G06K 9/6218; G06N 3/0481; G06N 3/08
See application file for complete search history.

(56) References Cited

U.S. PATENT DOCUMENTS

| | | | |
|---|---|---|---|
| 2018/0336880 A1* | 11/2018 | Arik | G10L 13/08 |
| 2018/0358003 A1* | 12/2018 | Calle | G10L 21/02 |
| 2019/0080222 A1* | 3/2019 | Glesner | G06F 3/0608 |
| 2019/0228779 A1* | 7/2019 | Lesso | G10L 17/18 |
| 2019/0236148 A1* | 8/2019 | DeFelice | G06F 40/216 |
| 2020/0026988 A1* | 1/2020 | Guo | G06K 9/6215 |
| 2020/0234411 A1* | 7/2020 | Xu | G06F 9/5027 |
| 2021/0043216 A1* | 2/2021 | Wang | G10L 17/06 |
| 2021/0125603 A1* | 4/2021 | Liang | G10L 17/18 |

OTHER PUBLICATIONS

Cheng et al, Speech Emotion Recognition Using Gaussian Mixture Model, The 2nd International Conference on Computer Application and System Modeling (2012), pp. 1222-1225 (Year: 2012).*

Lakshmi et al, Off-Line Signature Verification Using Neural Networks, 2013 3rd IEEE International Advance Computing Conference (IACC), pp. 1065-1069 (Year: 2013).*

* cited by examiner

METHOD AND APPARATUS FOR ESTABLISHING VOICEPRINT MODEL, COMPUTER DEVICE, AND STORAGE MEDIUM

The present application claims priority to Chinese Patent Application No. 201810433792.X, filed with the National Intellectual Property Administration, PRC on May 8, 2018, and entitled "METHOD AND APPARATUS FOR ESTABLISHING VOICEPRINT MODEL, COMPUTER DEVICE, AND STORAGE MEDIUM", which is incorporated herein by reference in its entirety.

TECHNICAL FIELD

The present disclosure relates to the field of computer technologies, and in particular, to a method and apparatus for establishing a voiceprint model, a computer device, and a storage medium.

BACKGROUND

The statements in this section merely provide background information related to the present disclosure and do not necessarily constitute prior art.

Voiceprint is an acoustic wave spectrum that carries verbal information and is displayed by an electroacoustic instrument. Modern scientific research shows that voiceprint is not only specific, but also relatively stable. A voice of an adult can remain relatively stable for a long time. A voiceprint recognition algorithm identifies a speaker by learning various speech features extracted from a sound map and establishing a recognition model.

SUMMARY

A method for establishing a voiceprint model, including:

framing an input speech signal of a target user, and separately extracting speech acoustic features of the framed speech signal;

inputting the plurality of speech acoustic features into a deep learning model that is based on neural network training, and collecting the speech acoustic features to form at least one cluster structure;

calculating an average value and a standard deviation of at least one of the cluster structure;

performing coordinate transformation and activation function calculation on the average value and the standard deviation to obtain a feature vector;

inputting the feature vector and an identity verification result of the target user into a preset basic model to obtain a voiceprint model corresponding to the target user, where the voiceprint model is used to verify whether an input speech signal belongs to the target user.

An apparatus for establishing a voiceprint model, including:

an extraction module, configured to frame an input speech signal of a target user, and separately extract speech acoustic features of the framed speech signal;

a cluster structure module, configured to input the plurality of speech acoustic features into a deep learning model that is based on neural network training, and collect the speech acoustic features to form at least one cluster structure;

a calculation module, configured to calculate an average value and a standard deviation of at least one of the cluster structure;

a feature vector module, configured to carry out coordinate transformation and activation function calculation on the average value and the standard deviation to obtain a feature vector; and a model module, configured to input the feature vector and an identity verification result of the target user into a preset basic model to obtain a voiceprint model corresponding to the target user, where the voiceprint model is used to verify whether an input speech signal belongs to the target user.

A computer device including a memory and a processor, where the memory stores a computer readable instruction, and the steps of any of the methods described above are implemented when the processor executes the computer readable instruction.

A non-volatile computer readable storage medium storing a computer readable instruction, where the steps of any of the methods described above are implemented when the computer readable instruction is executed by a processor.

DETAILED DESCRIPTION

Figure 1:
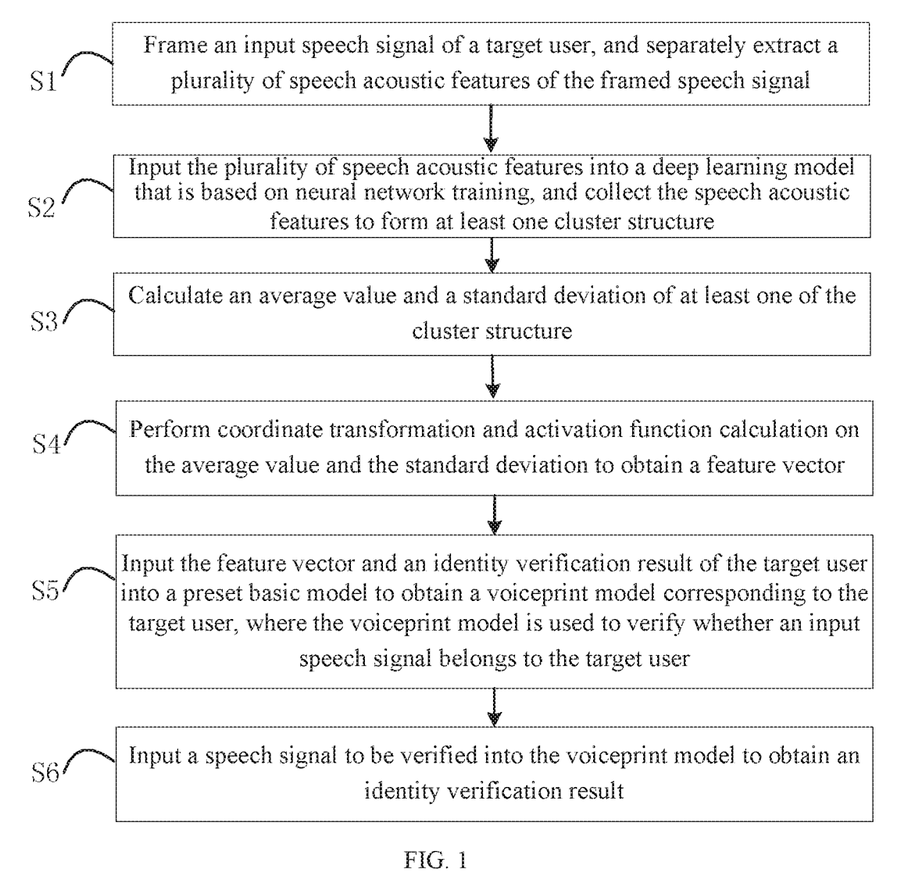
FIG. 1 is a schematic flow chart of a method for establishing a voiceprint model according to some embodiments.

Referring to FIG. 1, some embodiments provide a method for establishing a voiceprint model, including the steps.

S1: Frame an input speech signal of a target user, and separately extract speech acoustic features of the framed speech signal.

S2: input the plurality of speech acoustic features into a deep learning model that is based on neural network training, and collect the speech acoustic features to form at least one cluster structure.

S3: Calculate an average value and a standard deviation of at least one of the cluster structure.

S4: Perform coordinate transformation and activation function calculation on the average value and the standard deviation to obtain a feature vector.

S5: Input the feature vector and an identity verification result of the target user into a preset basic model to obtain a voiceprint model corresponding to the target user, where the voiceprint model is used to verify whether an input speech signal belongs to the target user.

As described in step S1, voiceprint is a sound wave spectrum that carries verbal information and is displayed by electroacoustic instruments. Generation of a human language is a complex physiological and physical process between the human language center and vocal organs. The vocal organs (tongue, teeth, throat, lungs, and nasal cavity) used by people in speech are very different in size and form, so the voiceprints of any two people are different. A speech signal is an analog signal that carries specific information, and a source thereof is a speech signal obtained by converting a sound signal emitted by a person. Each person's voiceprint is different, and thus speech signals obtained by converting the sounds generated by the same person who speaks the same word are also different. Therefore, speech acoustic features contained in the speech signal are also different. The speech acoustic features are voiceprint information contained in the sound emitted by each person. Framing refers to dividing a continuous speech signal into multiple segments. At the speech rate of a normal speech, the duration of the phoneme is about 50 to 200 ms, so the frame length is generally less than 50 ms, Microscopically, the frame length also necessarily includes enough vibration cycles. For the audio frequency of voice, the male voice is about 100 Hz, the female voice is about 200 Hz, and the cycles obtained by conversion are 10 ms and 5 ms. Generally, a frame should contain multiple cycles, and thus the cycle is generally at least 20 ms. The so-called speech signal includes a continuous speech, such as a sentence and a paragraph. The speech acoustic feature may be a Mel-Frequency Cepstral Coefficient (MFCC), or a Perceptual Linear Prediction Coefficient (PLP), or a Filter Bank Feature, or the like of a speech segment. Certainly, the speech acoustic feature may also be original speech data of the speech segment. Extracting the speech acoustic features of the speech signals of the target user means that the speech signals of the person who needs to build a voiceprint model are extracted, while speech signals generated by a non-target user are not extracted. The speech acoustic features are a speech signal containing a spoken portion extracted from a continuous speech signal and thus are a continuous speech signal. A plurality of segments of speech signals are obtained by framing the speech signal, and speech acoustic features of each segment of speech signals are separately extracted, thereby obtaining a plurality of speech acoustic features.

As described in step S2, the speech acoustic features are extracted from the framed speech signal and are a segment of speech signals, and the speech signal is input into a neural network training model, with the purpose of collecting and calculating the speech acoustic features, which facilitates statistics collection and calculation of speech acoustic features. A cluster structure is a collecting and calculating result for one or more speech acoustic features, which can embody the same common features of a plurality of speech acoustic features collected together.

As described in step S3, after a plurality of speech acoustic features are input into the deep learning model that is based on the neural network, at least one cluster structure x1, x2, x1, . . . , xn is output and obtained, and assuming that the cluster structure is a p-dimensional vector, xn=(xi1, xi2, . . . , xip)$^T$(i=1,2, . . . n). The average value and the standard deviation of the cluster structures are calculated. The average value and the standard deviation of the cluster structures are obtained. A method for calculating the average value of a plurality of cluster structures is as follows: first according to a formula:

$$xj = \frac{1}{n}\sum_{i=1}^{n} xij (j = 1, 2, \ldots p),$$

calculating the average value of each component, then calculating average vectors of p dimensions according to a formula: x0=(x1,x2, . . . ,xj)$^T$, and combining the average vectors of the p dimensions to form the average value of the cluster structures: E(x). A formula for calculating the standard deviation of a plurality of cluster structures is D(x)=E{[x−E(x)][x−E(x)]$^T$}.

As described in step S4, the foregoing E(x) and D(x) are subjected to a-level mapping and b-level mapping. The a-level mapping is to perform coordinate transformation on the average value and standard deviation of the cluster structure, the b-level mapping is to calculate the average value and standard deviation of the cluster structure through an activation function to obtain a nonlinear result, where the result is a feature vector for establishing a voiceprint model.

As described in step S5, a system inputs the feature vector and an identity verification result of the target user into a preset basic model to obtain a voiceprint model of the target user, and after receiving a speech signal, the voiceprint model determines whether a person who generates the speech signal is the target user. The basic model refers to a neural network model, such as a BP neural network model. The BP neural network is a multilayer network for weight training of nonlinear differentiable functions. The biggest characteristic of the BP neural network is that the highly non-linear mapping of the system from pm space to yn space n (the number of output nodes) composed of pattern vectors p of m input neurons can be achieved only by means of sample data with no need to establish a mathematical model of the system. For the foregoing a-level mapping and b-level mapping, the processes of the two mappings are not listed in any particular order. Sigmoid can be used as the activation function of the b-level mapping. The Sigmoid function is a common S function in biology, also known as a sigmoid growth curve, which is mainly used as a threshold function of a neural network and is physically closest to a biological neuron. The form of a nonlinear activation function of the Sigmoid function is σ(x)=1/(1+e$^{-x}$), where x is an input speech acoustic feature, and e is a natural constant, which is a rule of mathematics and is about 2.71828.

Figure 2:
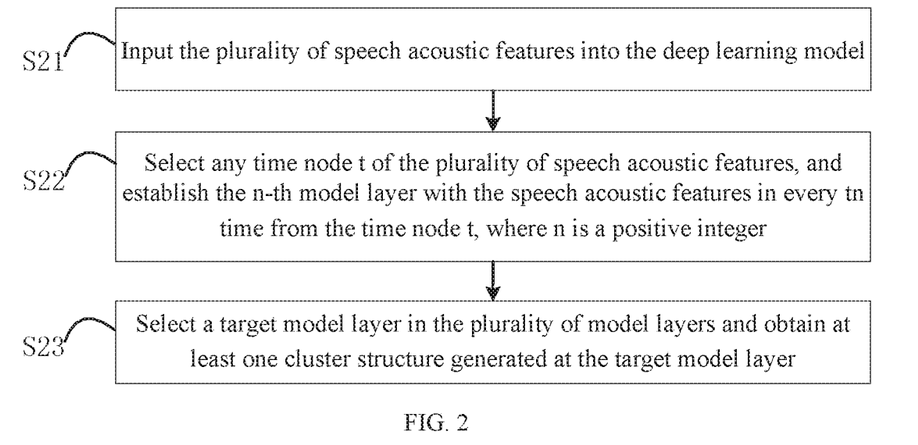
FIG. 2 is a schematic flow chart of step S2 of a method for establishing a voiceprint model according to some embodiments.

Referring to FIG. 2, in some embodiments, the deep learning model includes a plurality of model layers. The step of inputting the plurality of speech acoustic features into a deep learning model that is based on neural network training, and collecting the speech acoustic features to form at least one cluster structure includes:

S21: input the plurality of speech acoustic features into the deep learning model.

S22: Select any time node t of the plurality of speech acoustic features, and establish the n-th model layer with the speech acoustic features in every tn time from the time node t, where n is a positive integer.

S23: Select a target model layer in the plurality of model layers and obtain at least one cluster structure generated at the target model layer.

As described in step S21, a plurality of speech acoustic features are extracted from a continuous speech signal, so that the plurality of speech acoustic features are also continuous. When the plurality of speech acoustic features are input into the deep learning model, the speech acoustic features are also input in time sequence.

As described in step S22, the plurality of speech acoustic features are each a continuous sound signal, and if combined together, the speech acoustic features are also a continuous sound signal. In the plurality of speech acoustic features, any time node t is selected, and then the speech acoustic features within a tn time period from the time t are collected to form a cluster structure at one of the model layers. Since the deep learning model has multiple model layers, the time node t selected on each model layer is different from the time period tn from the time t, and the number of cluster structures generated by each model layer is not exactly the same. For example, the plurality of speech acoustic features have a total of 10 s, namely 10000 ms. The selected time node is the 2000-th ms, and a first model layer is established. The first model layer is established at intervals of t1 (1 ms), and then the first model layers have a total of 10000 frames. Then a second model layer is established, t2 is taken as 2 ms. The second model layer is established every 2 ms, and the second model layers have a total of 500 frames.

As described in step S23, a plurality of model layers are obtained after learning by the deep learning model, and each model layer has a plurality of cluster structures. The system selects one of the model layers as the target model layer, and selects cluster structures at the target model layer as parameters for subsequent generation of a voiceprint model.

Figure 3:
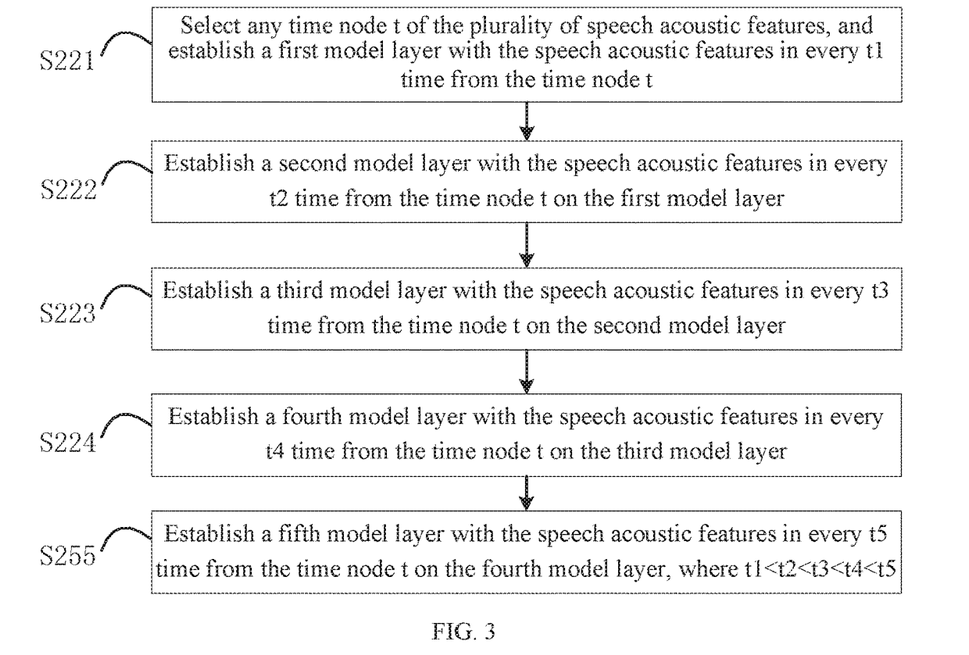
FIG. 3 is a schematic flow chart of step S22 of a method for establishing a voiceprint model according to some embodiments.

Referring to FIG. 3, in some embodiments, a 5-layer model layer is established, and step S22 includes the following steps.

S221: Select any time node t of the plurality of speech acoustic features, and establish a first model layer with the speech acoustic features in every t1 time from the time node t.

S222: Establish a second model layer with the speech acoustic features in every t2 time from the time node t on the first model layer.

S223: Establish a third model layer with the speech acoustic features in every t3 time from the time node t on the second model layer.

S224: Establish a fourth model layer with the speech acoustic features in every t4 time from the time node t on the third model layer.

S225: Establish a fifth model layer with the speech acoustic features in every t5 time from the time node t on the fourth model layer, where t1<t2<t3<t4<t5.

As described in step S221, any time node t is selected. For example, the speech acoustic features have 10 s, namely 10000 ms. The selected time node is the 2000-th ms, and a first model layer is established. The first model layer is established at intervals of t1 (1 ms), and then the first model layers have a total of 10000 frames.

In step S222, based on the first model layer, it is still selected that the time node is the 2000-th ms. The second model layer is established every t2 (2 ms), and then the second model layers have a total of 5000 frames. In step S223, based on the second model layer, it is still selected that the time node is the 2000-th ms. The third model layer is established every t3 (3 ms), and then the third model layers have a total of 3334 frames. In step S224, based on the third model layer, it is still selected that the time node is the 2000-th ms. The fourth model layer is established every t4 (4 ms), and then the fourth model layers have a total of 2500 frames. In step S225, based on the fourth model layer, it is still selected that the time node is the 2000-th ms. The second model layer is established every t5 (8 ms), and then the second model layers have a total of 1250 frames. Finally, 1250 frames on the fifth model layer are collected to form cluster structures, and 1250 cluster structures are finally obtained through a five-layer deep learning model.

Figure 4:
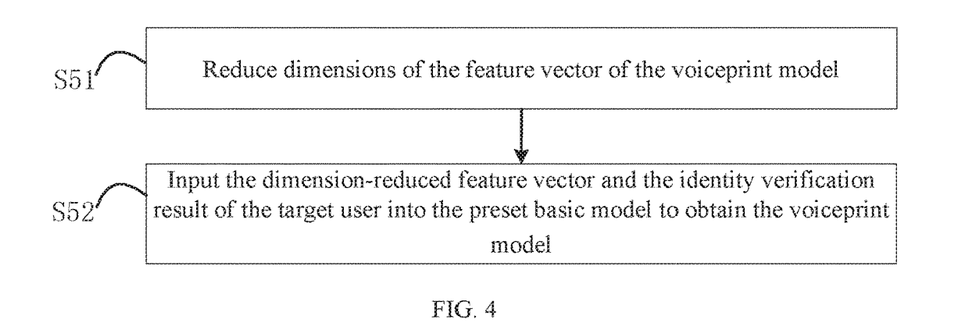
FIG. 4 is a schematic flow chart of step S5 of a method for establishing a voiceprint model according to some embodiments.

Referring to FIG. 4, further, in some embodiments, the step of inputting the feature vector and an identity verification result of the target user into a preset basic model to obtain a voiceprint model corresponding to the target user includes the following steps.

S51: Reduce dimensions of the feature vector of the voiceprint model.

S52: Input the dimension-reduced feature vector and the identity verification result of the target user into the preset basic model to obtain the voiceprint model.

In the foregoing steps, the system uses a Linear Discriminant Analysis (LDA) based on probability to reduce dimensions. The model design of the voiceprint of the target user is then performed. At the same time, an output layer adopts a Softmax function calculation result. All nodes are initialized with uniform random weights in the interval [−0.05 to 0.05], the initial offset is 0, and the final voiceprint model is obtained. The input of the softmax function is a vector, and the output thereof is also a vector. Each element in the vector is a probability value between 0 and 1. When the training model is biased, if the deviation degree between a prediction tag and an original real tag of the training set obtained from each training is too small, over-fitting will be caused, because the noise in the training set may also be learned. Therefore, the bias characterizes the fitting capacity of a learning algorithm itself. If the fitting capacity is not good, the bias is large, so that under-fitting is caused. In contrast, if the fitting capacity is too good, the bias is small, and over-fitting occurs easily. During the training, it can be found that the bias should be gradually smaller in theory, indicating that the model is learning useful things continuously.

Figure 5:
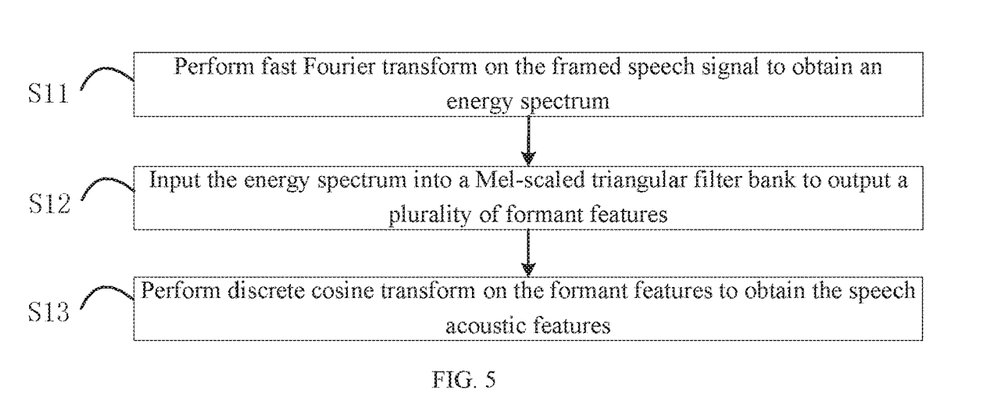
FIG. 5 is a schematic flow chart of step S1 of a method for establishing a voiceprint model according to some embodiments.

Referring to FIG. 5, in some embodiments, the step of extracting speech acoustic features of the framed speech signal includes the following steps.

S11: Perform fast Fourier transform on the framed speech signal to obtain an energy spectrum.

S12: Input the energy spectrum into a Mel-scaled triangular filter bank to output a plurality of formant features.

S13: Perform discrete cosine transform on the formant features to obtain the speech acoustic features.

In step S11, the effective speech signal extracted after framing is subjected to fast Fourier transform, and the speech signal in the time domain is converted into the energy spectrum in the frequency domain. Fast Fourier transform (FFT) is a fast algorithm of discrete Fourier transform. The FFT is obtained by improving the algorithm of discrete Fourier transform based on odd, even, imaginary and real and other characteristics of the discrete Fourier transform.

In step S12, formant is an important feature reflecting the resonance characteristics of the vocal tract, which represents the most direct source of pronunciation information, and people use formant information in speech perception. The formant is an important feature parameter in speech signal processing and has been widely used as the main feature of speech recognition and basic information of speech coding transmission. Formant information is contained in the frequency envelope. Therefore, the key to formant parameter extraction is to estimate the spectral envelope of natural speech. It is generally believed that the maximum value in the spectral envelope is the formant. The energy spectrum is then input to a Mel-scaled triangular filter to calculate logarithmic energy output by each filter bank, and features of filter bank output are also called Filter Bank (FBANK) features. The purpose of filtering with the Mel-scaled filter bank is that there are many redundancies in frequency domain signals, the filter bank can simplify the amplitude of frequency domain, and each frequency band is represented by a value. The specific step of filtering is to multiply and accumulate the frequency spectrum obtained after fast Fourier transform with each filter, and the obtained value is the energy value of the frame data in the frequency band corresponding to the filter.

In step S13, after the formant feature is calculated by logarithmic energy, an MFCC (mel frequency cepstrum coefficient), namely an MFCC acoustic feature, can be obtained by discrete cosine transform. Since the human ear's perception of sound is not linear, log as a nonlinear relation is used for better description. Cepstrum analysis can only be performed after log is taken. Therefore, the energy value is logarithmically calculated to obtain logarithmic energy. Because the result of discrete cosine transform has no imaginary part, it is better to calculate. Therefore, the logarithmic energy is subjected to discrete cosine transform, and finally the MFCC, namely the MFCC acoustic feature, is obtained.

Further, after the step of obtaining a voiceprint model, the method includes the following step.

S6: Input a speech signal to be verified into the voiceprint model to obtain an identity verification result.

As described in step S6, after a voiceprint model is established, the voiceprint model has a port for receiving speech signals. After receiving a speech signal, the voiceprint model calculates the speech signal. If the speech signal is a speech signal of the target user, a signal indicating a correct target is output. If the speech signal is not the speech signal of the target user, a signal indicating a wrong target is output.

Figure 6:
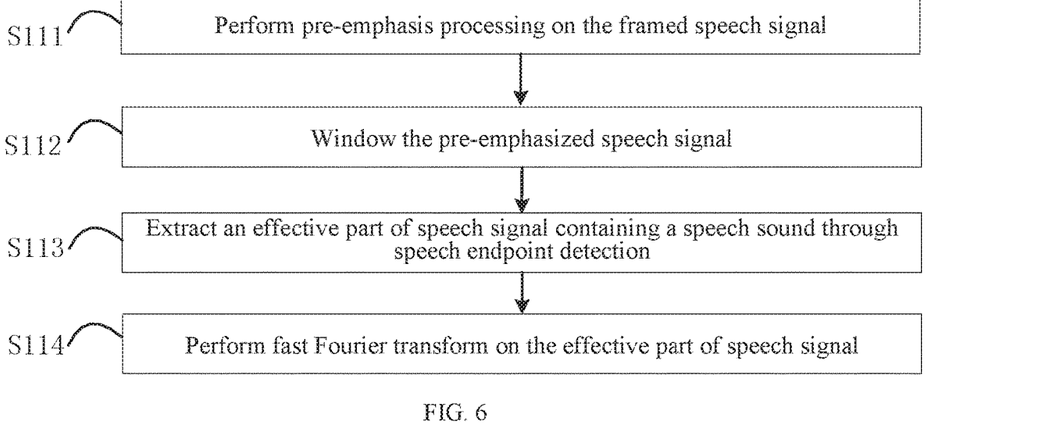
FIG. 6 is a schematic flow chart of step S11 of a method for establishing a voiceprint model according to some embodiments.

Referring to FIG. 6, further, the step of performing fast Fourier transform on the framed speech signal includes the following steps.

S111: Perform pre-emphasis processing on the framed speech signal.

S112: Window the pre-emphasized speech signal.

S113: Extract an effective part of speech signal containing a speech sound through speech endpoint detection.

S114: Perform fast Fourier transform on the effective part of speech signal.

In step S111, the speech signal is pre-emphasized. Since the speech signal also contains some noises, if the speech signal is directly subjected to voiceprint modeling processing, some effects including noises are obtained, and the established model is inaccurate, resulting in an increase in recognition error rate. Direct extraction of an effective speech is realized by a method of speech endpoint detection, namely by recognizing when in the speech a person starts to speak and when the person ends the speaking. The main principle of speech endpoint detection is that the speech spectrum of an audio file containing human speech is higher than that of an audio file containing no human speech. Therefore, before an effective speech is extracted, the speech signal is first pre-emphasized; that is, the speech signal is amplified to make the frequency spectrum containing the human speech higher, the difference between the two is more obvious, and speech endpoint detection is performed better.

In step S112, one of the goals that speech signal processing often achieves is to clarify the distribution of frequency components in the speech. A mathematical tool for doing this is the Fourier transform. The Fourier transform requires an input signal to be stable. However, the speech is unstable from macro perspective. However, from micro perspective, the speech signal can be seen as stable, and can be intercepted to perform the Fourier transform. The purpose of windowing is to make the amplitude of a frame of signal gradually change to 0 at both ends. Gradual change to 0 is good for Fourier transform and can improve the resolution of a transform result (namely a spectrum).

In step S113, since the speech signal also contains some noise, if the speech signal is directly subjected to voiceprint modeling processing, some effects including noise are obtained, and the established model is inaccurate, directly resulting in an increase in recognition error rate. Direct extraction of an effective speech is realized by a method of speech endpoint detection, namely by recognizing when in the speech a person starts to speak and when the person ends the speaking. Through endpoint detection, speech and noise are distinguished and effective speech parts are extracted. People pause when speaking. An effective part of speech is extracted, that is, the noise part when a person pauses while speaking is removed, and only the effective speech of human speech is extracted.

In step S114, Fast Fourier transform (FFT) is a fast algorithm of discrete Fourier transform. The FFT is obtained by improving the algorithm of discrete Fourier transform based on odd, even, imaginary and real and other characteristics of the discrete Fourier transform. In this way, the speech acoustic features of the speaker in a speech can be calculated.

Figure 7:
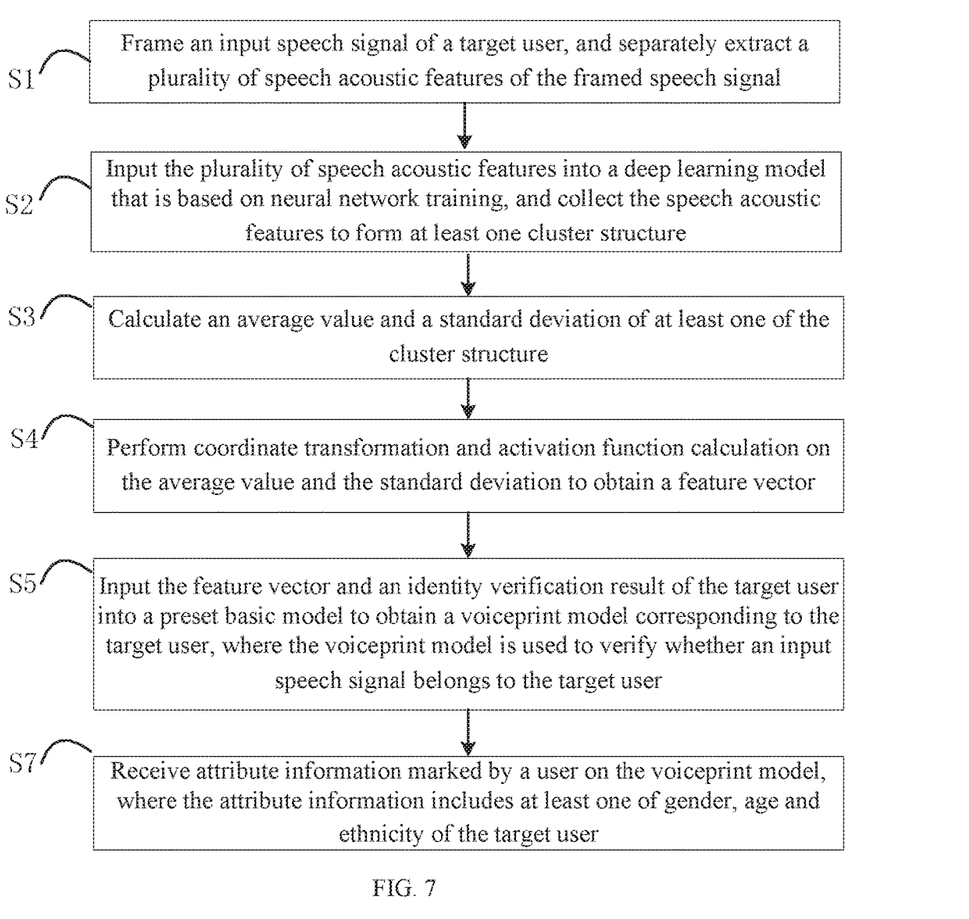
FIG. 7 is a schematic flow chart of a method for establishing a voiceprint model according to some embodiments.

Referring to FIG. 7, further, after the step of obtaining a voiceprint model, the method includes the following step.

S7: Receive attribute information marked by a user on the voiceprint model, where the attribute information including at least one of gender, age and ethnicity of the target user.

In step S7, after the voiceprint model is established, the system receives a mark added by the user to the voiceprint model, and marks personal information of the target user corresponding to the voiceprint model, including gender, age, nationality, height, weight, and the like. As voiceprint information is related to vocal organs, vocal control organs include vocal cords, soft palate, tongue, teeth, lips, and the like. Vocal resonators include pharyngeal cavity, oral cavity and nasal cavity. People with similar vocal organs have certain sound similarities or close sounds. Therefore, people with the same attribute information have similar voiceprint information. After voiceprint information of multiple people is collected, the voiceprint information is summarized to find out the relationship between voiceprint information and people.

Figure 8:
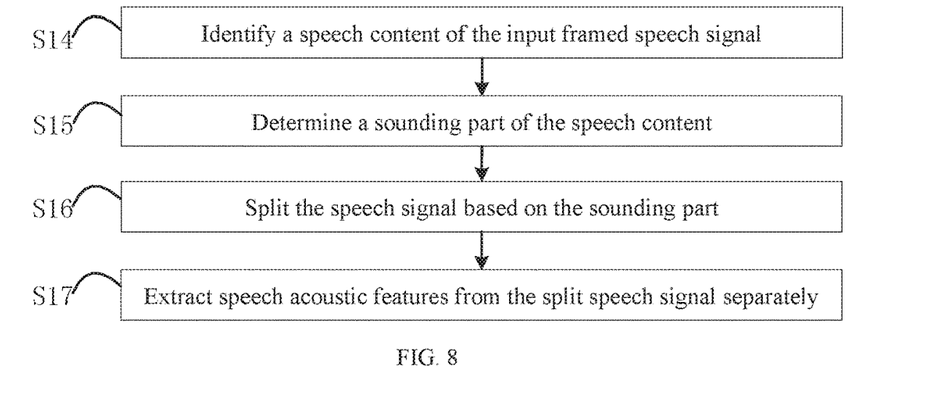
FIG. 8 is a schematic flow chart of step S1 of a method for establishing a voiceprint model according to some embodiments.

Referring to FIG. 8, further, in some embodiments, the step of extracting speech acoustic features of the framed speech signal includes the following steps.

S14: Identify a speech content of the input framed speech signal.

S15: Determine a sounding part of the speech content.

S16: Split the speech signal based on the sounding part.

S17: Extract speech acoustic features from the split speech signal separately.

In step S14, a speech content of the input framed speech signal is identified, that is, the speech signal is identified by means of speech identification, and specific speech text information of the speaker is identified.

In step S15, a sounding part of the speech content is determined, that is, spelling or phonetic symbols of the speech content are read based on the speech content identified in S14, and a sounding part is determined based on the content of the spelling or phonetic symbols. Commonly used main sounding parts are throat, tongue, nose, teeth, and the like. For example, in Mandarin, the corresponding sounding parts are determined based on different initials. The corresponding table of specific initials and sounding parts is as follows:

| Initial | Sounding part |
|---------|---------------|
| b p m | Upper lip and lower lip |
| f | Upper teeth and lower lip |
| z c s | Anterior tongue tip and upper tooth back |
| d t n l | Middle of tongue tip and upper alveolar ridge |
| zh ch sh r | Posterior tongue tip and anterior hard palate |
| j q x | Lingual surface and middle of hard palate |
| g k h | Lingual root and posterior hard palate |

In step S16, after the sounding part of the speech content is determined, the sounding part of the speech signal is retrospectively checked, and the speech signal is split into a plurality of segments based on the sounding part corresponding to the speech signal. Each segment of speech signals corresponds to one sounding part. For example, for a speech signal with a duration of 10 s, the speech content of the 0th-2rd s contains an initial b or p or m, the speech content of the 3rd-5th s contains an initial j or q or x, the voice content of the 6th-10th seconds includes an initial d or t or n or l, and then the speech signal is split into three segments of speech signals. The first segment is the speech content of the 0th-2rd s, the second segment is the speech content of the 3rd-5th s, and the third segment is the speech content of the 6th-10th s.

In step S17, acoustic features are separately extracted from the three segments of speech contents, and then the acoustic features are separately input into the subsequent deep learning model for calculation.

According to the method for establishing a voiceprint model provided by some embodiments, a cluster structure is obtained from extracted speech acoustic features based on deep neural network training and then coordinate mapping and activation function calculation is performed on the cluster structure to obtain a voiceprint model, and the voice recognition error rate of the voiceprint model can be reduced.

Figure 9:
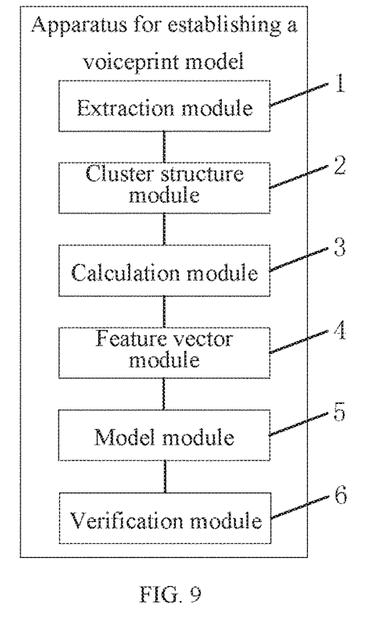
FIG. 9 is a schematic structural diagram of an apparatus for establishing a voiceprint model according to some embodiments.

Referring to FIG. 9, some embodiments provide an apparatus for establishing a voiceprint model, including:

an extraction module 1, configured to frame an input speech signal of a target user, and separately extract speech acoustic features of the framed speech signal;

a cluster structure module 2, configured to input the plurality of speech acoustic features into a deep learning model that is based on neural network training, and collect the speech acoustic features to form at least one cluster structure;

a calculation module 3, configured to calculate an average value and a standard deviation of at least one of the cluster structure;

a feature vector module 4, configured to carry out coordinate transformation and activation function calculation on the average value and the standard deviation to obtain a feature vector; and a model module 5, configured to input the feature vector and an identity verification result of the target user into a preset basic model to obtain a voiceprint model corresponding to the target user, where the voiceprint model is used to verify whether an input speech signal belongs to the target user.

In some embodiments, voiceprint in the extraction module 1 is a sound wave spectrum that carries verbal information and is displayed by electroacoustic instruments. Generation of a human language is a complex physiological and physical process between the human language center and vocal organs. The vocal organs (tongue, teeth, throat, lungs, and nasal cavity) used by people in speech are very different in size and form, so the voiceprints of any two people are different. A speech signal is an analog signal that carries specific information, and a source thereof is a speech signal obtained by converting a sound signal emitted by a person, Each person's voiceprint is different, and thus speech signals obtained by converting the sounds generated by the same person who speaks the same word are also different. Therefore, speech acoustic features contained in the speech signal are also different. The speech acoustic features are voiceprint information contained in the sound emitted by each person. Framing refers to dividing a continuous speech signal into multiple segments. At a speech rate of a normal speech, the duration of the phoneme is about 50 to 200 milliseconds, so the frame length is generally less than 50 milliseconds. Microscopically, the frame length also necessarily includes enough vibration cycles. For the audio frequency of voice, the male voice is about 100 Hz, the female voice is about 200 Hz, and the cycles obtained by conversion are 10 ms and 5 ms. Generally, a frame should contain multiple cycles, and thus the cycle is generally at least 20 ms. The so-called speech signal includes a continuous speech, such as a sentence and a paragraph. The speech acoustic feature may be a MFCC, or a PLP, or a Filter Bank Feature, or the like of a speech segment. Certainly, the speech acoustic feature may also be original speech data of the speech segment. The extraction module 1 extracts the speech acoustic features of the speech signals of the target user, which means that the speech signals of the person who needs to build a voiceprint model are extracted, while speech signals generated by a non-target user are not extracted. The speech acoustic features are a speech signal containing a spoken portion extracted from a continuous speech signal and thus are a continuous speech signal. After framing the speech signal, the extraction module 1 obtains a plurality of segments of speech signals, and separately extracts speech acoustic features of each segment of speech signals, thereby obtaining a plurality of speech acoustic features.

The speech acoustic features are extracted from the framed speech signal and are a segment of speech signals. The cluster structure module 2 inputs the speech signal into the neural network training model, with the purpose of collecting and calculating the speech acoustic features, which facilitates statistics collection and calculation of speech acoustic features. The cluster structure module 2 collects the segment of speech acoustic features, which can embody the same common features of a plurality of speech acoustic features collected together.

After inputting a plurality of speech acoustic features into the deep learning model that is based on the neural network, the calculation module 3 inputs and obtains at least one cluster structure x1, x2, x1, . . . , xn, and if the cluster structure is a p-dimensional vector, xn=(xi1,xi2, . . . , xip)$^T$(i=1,2, . . . n). The average value and the standard deviation of the cluster structures are calculated. The average value and the standard deviation of the cluster structures are obtained. A method for calculating the average value of a plurality of cluster structures is as follows: first according to a formula:

$$xj = \frac{1}{n}\sum_{i=1}^{n} xij (j = 1, 2, \ldots p),$$

the calculation module 3 calculates the average value of each component, then the calculation module 3 calculates average vectors of p dimensions according to a formula: x0=(x1,x2, . . . ,xj)$^T$, and the calculation module 3 combines the average vectors of the p dimensions to form the average value of the cluster structures: E(x). The formula for calculating the standard deviation of a plurality of cluster structures by the calculation module 3 is: D(x)=E{[x−E(x)][x−E(x)]$^T$}

The feature vector module 4 subjects the foregoing E(x) and D(x) to a-level mapping and b-level mapping. The a-level mapping is to perform coordinate transformation on the average value and standard deviation of the cluster structure, and the b-level mapping is to calculate the average value and standard deviation of the cluster structure through an activation function and then obtain a nonlinear result, where the result is a feature vector for establishing a voiceprint model.

The model module 5 inputs the feature vector and an identity verification result of the target user into a preset basic model to obtain a voiceprint model of the target user, and after receiving a speech signal, the voiceprint model determines whether a person who generates the speech signal is the target user. The basic model refers to a neural network model, such as a BP neural network model. The BP neural network is a multi-layer network for weight training of nonlinear differentiable functions. The biggest characteristic of the BP neural network is that the highly non-linear mapping of the system from pm space to yn space n (the number of output nodes) composed of pattern vectors p of m input neurons can be achieved only by means of sample data with no need to establish a mathematical model of the system. For the foregoing a-level mapping and b-level mapping, the processes of the two mapping are not listed in any particular order. Sigmoid can be used as the activation function of the b-level mapping. The Sigmoid function is a common S function in biology, also known as a sigmoid growth curve, which is mainly used as a threshold function of a neural network and is physically closest to a biological neuron. The form of a nonlinear activation function of the Sigmoid function is σ(x)=1/(1+e$^{-x}$), where x is an input speech acoustic feature, and e is a natural constant, which is a rule of mathematics and is about 2.71828.

Figure 10:
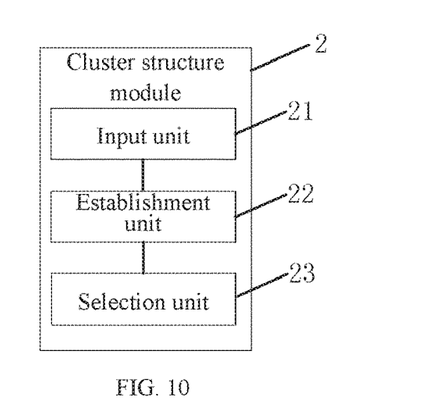
FIG. 10 is a schematic structural diagram of a cluster structure module of an apparatus for establishing a voiceprint model according to some embodiments.

Referring to FIG. 10, in some embodiments, the deep learning model includes a plurality of model layers, and the cluster structure module 2 includes:

an input unit 21, configured to input the plurality of speech acoustic features into the deep learning model;

an establishment unit 22, configured to select any time node t of the plurality of speech acoustic features, and establish the n-th model layer with the speech acoustic features in every tn time from the time node t, where n is a positive integer; and a selection unit 23, configured to select a target model layer in the plurality of model layers and obtain at least one cluster structure generated at the target model layer.

In some embodiments, a plurality of speech acoustic features are extracted from a continuous speech signal, so that the plurality of speech acoustic features are also continuous. The input unit 21 also inputs the speech acoustic features in a time sequence when the plurality of speech acoustic features are input into the deep learning model.

The plurality of speech acoustic features are each a continuous sound signal, and after being combined together, the speech acoustic features are also a continuous sound signal. In the plurality of speech acoustic features, the establishment unit 22 selects any time node t, and then collects the speech acoustic features within a tn time period from the time t to form a cluster structure at one of the model layers. Since the deep learning model has multiple model layers, the time node t selected on each model layer is different from the time period tn from the time t, and the number of cluster structures generated by each model layer is not exactly the same. For example, the plurality of speech acoustic features have a total of 10 s, namely 10000 ms. The selected time node is the 2000-th ins, and the establishment unit 22 establishes a first model layer. The first model layer is established at intervals of t1 (1 ms), and then the first model layers have a total of 10000 frames. Then the establishment unit 22 establishes a second model layer, and takes t2 as 2 ms. The second model layer is established every 2 ms, and the second model layers have a total of 500 frames.

A plurality of model layers are obtained after learning by the deep learning model, and each model layer has a plurality of cluster structures. The selection unit 23 selects cluster structures at one of the model layers as parameters for subsequent generation of a voiceprint model.

Figure 11:
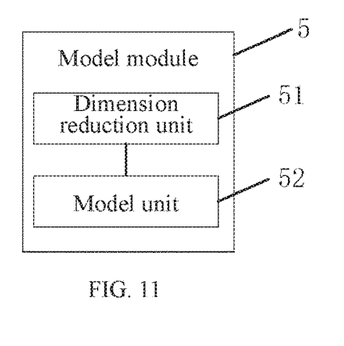
FIG. 11 is a schematic structural diagram of a model module of an apparatus for establishing a voiceprint model according to some embodiments.

Referring to FIG. 11, further, the model module 4 includes:

a dimension reduction unit 51, configured to reduce dimensions of the feature vector of the voiceprint model; and a model unit 52, configured to input the dimension-reduced feature vector into the preset basic model to obtain the voiceprint model.

In some embodiments, the dimension reduction unit 51 uses an LDA based on probability to reduce dimensions. The model unit 52 then performs model design of the voiceprint of the target user. At the same time, an output layer adopts a Softmax function calculation result. All nodes are initialized with uniform random weights in the interval [−0.05 to 0.05], the initial offset is 0, and the final voiceprint model is obtained. The input of the Softmax function is a vector, and the output thereof is also a vector. Each element in the vector is a probability value between 0 and 1. When the training model is biased, if the deviation degree between a prediction tag and an original real tag of the training set obtained from each training is too small, over-fitting will be caused, because the noise in the training set may also be learned. Therefore, the bias characterizes the fitting capacity of a learning algorithm itself. If the fitting capacity is not good, the bias is large, so that under-fitting is caused. In contrast, if the fitting capacity is too good, the bias is small, and over-fitting occurs easily. During the training, it can be found that the bias should be gradually smaller in theory, indicating that the model is learning useful things continuously.

Figure 12:
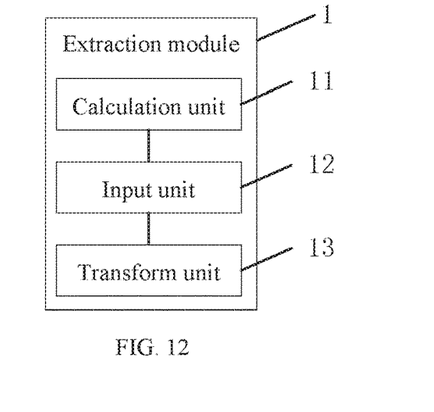
FIG. 12 is a schematic structural diagram of an extraction module of an apparatus for establishing a voiceprint model according to some embodiments.

Referring to FIG. 12, further, the extraction module 1 includes:

a calculation unit 11, configured to perform fast Fourier transform on the framed speech signal to obtain an energy spectrum;

an input unit 12, configured to input the energy spectrum into a Mel-scaled triangular filter bank to output a plurality of formant features; and a transform unit 13, configured to perform discrete cosine transform on the formant features to obtain the speech acoustic features.

In some embodiments, the calculation unit 11 subjects the effective speech signal extracted after framing to fast Fourier transform, and converts the speech signal in the time domain into the energy spectrum in the frequency domain. FFT is a fast algorithm of discrete Fourier transform. The FFT is obtained by improving the algorithm of discrete Fourier transform based on odd, even, imaginary and real and other characteristics of the discrete Fourier transform. Formant is an important feature reflecting the resonance characteristics of the vocal tract, which represents the most direct source of pronunciation information, and people use formant information in speech perception. The formant is a very important feature parameter in speech signal processing and has been widely used as the main feature of speech recognition and basic information of speech coding transmission. Formant information is contained in the frequency envelope, so the key to formant parameter extraction is to estimate the spectral envelope of natural speech. It is generally believed that the maximum value in the spectral envelope is the formant. The input unit 12 then inputs energy spectrum to a Mel-scaled triangular filter bank to calculate logarithmic energy output by each filter bank, and features of filter bank output are also called FBANK features. The purpose of filtering with the Mel-scaled filter bank is that there are many redundancies in frequency domain signals, the filter bank can simplify the amplitude of frequency domain, and each frequency band is represented by a value. The specific step of filtering is to multiply and accumulate the frequency spectrum obtained after fast Fourier transform with each filter, and the obtained value is the energy value of the frame data in the frequency band corresponding to the filter. After the formant feature is calculated by logarithmic energy, an MFCC, namely an MFCC acoustic feature, can be obtained by discrete cosine transform performed by the transform unit 13. Since the human ear's perception of sound is not linear, log as a nonlinear relation is used for better description. Cepstrum analysis can only be performed after log is taken, Therefore, the energy value is logarithmically calculated to obtain logarithmic energy. Because the result of discrete cosine transform has no imaginary part, it is better to calculate. Therefore, the logarithmic energy is subjected to discrete cosine transform, and finally the MFCC, namely the MFCC acoustic feature, is obtained.

Further, the foregoing apparatus for establishing a voiceprint model also includes:

a verification module 6, configured to input a speech signal to be verified into the voiceprint model to obtain an identity verification result.

In some embodiments, after the voiceprint model is established, the voiceprint model has a port for receiving speech signals. After the verification module 6 receives a speech signal, the voiceprint model calculates the speech signal. If the speech signal is a speech signal of the target user, the verification module 6 outputs a signal indicating a correct target. If the speech signal is not the speech signal of the target user, the verification module 6 outputs a signal indicating a wrong target.

Figure 13:
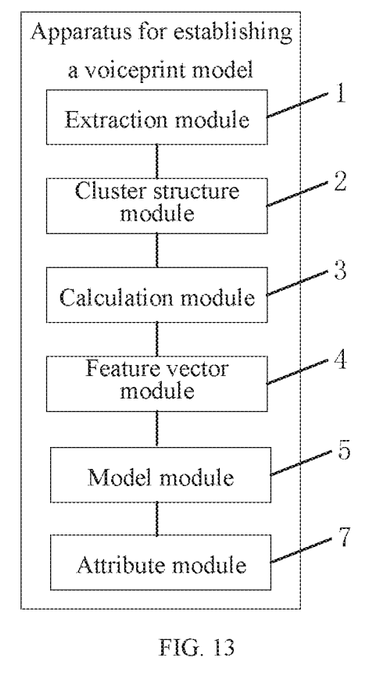
FIG. 13 is a schematic structural diagram of an apparatus for establishing a voiceprint model according to some embodiments.

Referring to FIG. 13, further, the apparatus for establishing a voiceprint model also includes:

an attribute module 7, configured to receive attribute information marked by a user on the voiceprint model, where the attribute information including at least one of gender, age and ethnicity of the target user.

In some embodiments, after the voiceprint model is established, the attribute module 7 receives a mark added by the user to the voiceprint model, and marks personal information of the target user corresponding to the voiceprint model, including gender, age, nationality, height, weight, and the like. As voiceprint information is related to vocal organs, vocal control organs include vocal cords, soft palate, tongue, teeth, lips, and the like. Vocal resonators include pharyngeal cavity, oral cavity and nasal cavity. People with similar vocal organs have certain sound similarities or close sounds. Therefore, people with the same attribute information have similar voiceprint information. After voiceprint information of multiple people is collected, the voiceprint information is summarized to find out the relationship between voiceprint information and people.

Figure 14:
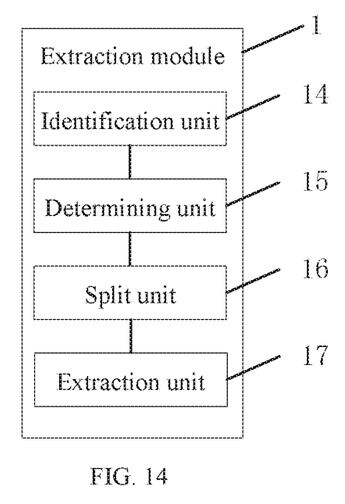
FIG. 14 is a schematic structural diagram of an extraction module of an apparatus for establishing a voiceprint model according to some embodiments.

Referring to FIG. 14, further, the extraction module 1 also includes:

an identification unit 14, configured to identify a speech content of the input framed speech signal;

a determining unit 15, configured to determine a sounding part of the speech content;

a split unit 16, configured to split the speech signal based on the sounding part; and an extraction unit 17, configured to extract speech acoustic features from the split speech signal separately.

In some embodiments, the identification unit 14 identifies a speech content of the input framed speech signal, that is, the speech signal is recognized by means of speech recognition, and specific speech text information of the speaker is recognized.

The determining unit 15 determines a sounding part of the speech content, that is, spelling or phonetic symbols of the speech content are read based on the speech content identified by the foregoing identification unit 14, and a sounding part is determined based on the content of the spelling or phonetic symbols. Commonly used main sounding parts are throat, tongue, nose, teeth, and the like. For example, in Mandarin, the corresponding sounding parts are determined based on different initials. The corresponding table of specific initials and sounding parts is as follows:

| Initial | Sounding part |
| --- | --- |
| b p m | Upper lip and lower lip |
| f | Upper teeth and lower lip |
| z c s | Anterior tongue tip and upper tooth back |
| d t n l | Middle of tongue tip and upper alveolar ridge |
| zh ch sh r | Posterior tongue tip and anterior hard palate |
| j q x | Lingual surface and middle of hard palate |
| g k h | Lingual root and posterior hard palate |

After the determining unit 15 determines the sounding part of the speech content, the split unit 16 retrospectively checks the sounding part of the speech signal, and then the split unit 16 splits the speech signal into a plurality of segments based on the sounding part corresponding to the speech signal. Each segment of speech signals corresponds to one sounding part. For example, for a speech signal with a duration of 10 s, the speech content of the 0th-2rd s contains an initial b or p or m, the speech content of the 3rd-5th s contains an initial j or q or x, the voice content of the 6th10th seconds includes an initial d or t or nor 1, and then the split unit 16 splits the speech signal into three segments of speech signals. The first segment is the speech content of the 0th-2rd s, the second segment is the speech content of the 3rd-5th s, and the third segment is the speech content of the 6th-10th s. Then the extraction unit 17 extracts acoustic features from the three segments of speech contents separately, and then separately inputs the acoustic features into the subsequent deep learning model for calculation.

According to the apparatus for establishing a voiceprint model provided by some embodiments, a cluster structure is obtained from extracted speech acoustic features based on deep neural network training and then coordinate mapping and activation function calculation is performed on the cluster structure to obtain a voiceprint model, and the voice recognition error rate of the voiceprint model can be reduced.

Figure 15:
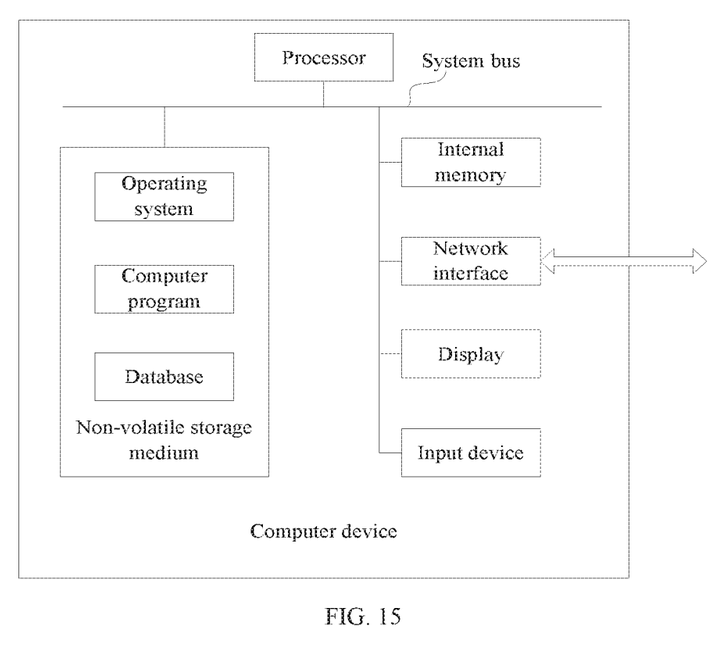
FIG. 15 is a schematic structural block diagram of a computer device according to some embodiments.

Referring to FIG. 15, some embodiments also provide a computer device, which may be a server, and an internal structure thereof may be as shown in FIG. 15. The computer device includes a processor, a memory, a network interface and a database which are connected by using a system bus. The processor designed by the computer is configured to provide computing and control capabilities. The memory of the computer device includes a non-volatile storage medium and an internal memory. The non-volatile storage medium stores an operating system, computer readable instructions, and a database. The internal memory provides an environment for the operation of the operating system and the computer readable instructions in the non-volatile storage medium. The database of the computer device is configured to store data such as data for establishing a voiceprint model. The network interface of the computer device is configured to communicate with an external terminal through a network. When the computer readable instruction is executed, a process of each of the foregoing methods according to the embodiments is executed. Those skilled in the art can understand that the structure shown in FIG. 15 is merely a block diagram of a partial structure related to the solution of some embodiments, and does not constitute a limitation on the computer device to which the solution of the present disclosure is applied.

Some embodiments also provide a non-volatile computer readable storage medium storing a computer readable instruction, where a process of each of the foregoing methods according to the embodiments is executed when the computer readable instruction is executed. The above descriptions are only some embodiments of the present disclosure, and are not intended to limit the patent scope of the present disclosure. Any equivalent structure or equivalent process transformation performed using the specification and the accompanying drawings of the present disclosure may be directly or indirectly applied to other related technical fields and similarly falls within the patent protection scope of the present disclosure.

What is claimed is:

1. A method for establishing a voiceprint model, comprising:
framing an input speech signal of a target user, and separately extracting a plurality of speech acoustic features of the framed speech signal;
inputting the plurality of speech acoustic features into a deep learning model that is based on neural network training, and collecting the plurality of speech acoustic features to form at least one cluster structure;
calculating an average value and a standard deviation of at least one of the cluster structure;
performing coordinate transformation and activation function calculation on the average value and the standard deviation to obtain a feature vector; and
inputting the feature vector and an identity verification result of the target user into a preset basic model to obtain a voiceprint model corresponding to the target user, wherein the voiceprint model is used to verify whether an input speech signal belongs to the target user.

2. The method for establishing a voiceprint model according to claim 1, wherein the deep learning model comprises a plurality of model layers, and the step of inputting the plurality of speech acoustic features into a deep learning model that is based on neural network training, and collecting the plurality of speech acoustic features to form at least one cluster structure comprises:
inputting the plurality of speech acoustic features into the deep learning model;
selecting any time node t of the plurality of speech acoustic features, and establishing an n-th model layer with the plurality of speech acoustic features in every to time from the time node t, wherein n is a positive integer; and
selecting a target model layer in the plurality of model layers and obtaining at least one cluster structure generated at the target model layer.

3. The method for establishing a voiceprint model according to claim 1, wherein the step of inputting the feature vector and an identity verification result of the target user into a preset basic model to obtain a voiceprint model corresponding to the target user comprises:
reducing dimensions of the feature vector of the voiceprint model; and
inputting the dimension-reduced feature vector and the identity verification result of the target user into the preset basic model to obtain the voiceprint model.

4. The method for establishing a voiceprint model according to claim 1, wherein the step of extracting the plurality of speech acoustic features of the framed speech signal comprises:
performing fast Fourier transform on the framed speech signal to obtain an energy spectrum;
inputting the energy spectrum into a Mel-scaled triangular filter bank to output a plurality of formant features; and
performing discrete cosine transform on the formant features to obtain the plurality of speech acoustic features.

5. The method for establishing a voiceprint model according to claim 1, wherein after the step of obtaining a voiceprint model, the method comprises:
inputting a speech signal to be verified into the voiceprint model to obtain an identity verification result.

6. The method for establishing a voiceprint model according to claim 1, wherein after the step of obtaining a voiceprint model, the method comprises:
receiving attribute information marked by a user on the voiceprint model, wherein the attribute information including at least one of gender, age and ethnicity of the target user.

7. The method for establishing a voiceprint model according to claim 1, wherein the step of extracting a plurality of speech acoustic features of the framed speech signal comprises:

identifying a speech content of the framed speech signal;
determining a sounding part of the speech content;
splitting the speech signal based on the sounding part; and
extracting a plurality of speech acoustic features from the split speech signal separately.

8. A computer device, comprising a memory storing computer readable instructions and a processor, wherein a method for establishing a voiceprint model is implemented when the processor executes the computer readable instructions, and the method for establishing a voiceprint model comprises:
framing an input speech signal of a target user, and separately extracting a plurality of speech acoustic features of the framed speech signal;
inputting the plurality of speech acoustic features into a deep learning model that is based on neural network training, and collecting the plurality of speech acoustic features to form at least one cluster structure;
calculating an average value and a standard deviation of at least one of the cluster structure;
performing coordinate transformation and activation function calculation on the average value and the standard deviation to obtain a feature vector; and
inputting the feature vector and an identity verification result of the target user into a preset basic model to obtain a voiceprint model corresponding to the target user, wherein the voiceprint model is used to verify whether an input speech signal belongs to the target user.

9. The computer device according to claim 8, wherein the deep learning model comprises a plurality of model layers, and the step of inputting the plurality of speech acoustic features into a deep learning model that is based on neural network training, and collecting the plurality of speech acoustic features to form at least one cluster structure comprises:
inputting the plurality of speech acoustic features into the deep learning model;
selecting any time node t of the plurality of speech acoustic features, and establishing an n-th model layer with the plurality of speech acoustic features in every to time from the time node t, wherein n is a positive integer; and
selecting a target model layer in the plurality of model layers and obtaining at least one cluster structure generated at the target model layer.

10. The computer device according to claim 8, wherein the step of inputting the feature vector and an identity verification result of the target user into a preset basic model to obtain a voiceprint model corresponding to the target user comprises:
reducing dimensions of the feature vector of the voiceprint model; and
inputting the dimension-reduced feature vector and the identity verification result of the target user into the preset basic model to obtain the voiceprint model.

11. The computer device according to claim 8, wherein the step of extracting the plurality of speech acoustic features of the framed speech signal comprises:
performing fast Fourier transform on the framed speech signal to obtain an energy spectrum;
inputting the energy spectrum into a Mel-scaled triangular filter bank to output a plurality of formant features; and
performing discrete cosine transform on the formant features to obtain the plurality of speech acoustic features.

12. The computer device according to claim 8, wherein after the step of obtaining a voiceprint model, the method comprises:
inputting a speech signal to be verified into the voiceprint model to obtain an identity verification result.

13. The computer device according to claim 8, wherein after the step of obtaining a voiceprint model, the method comprises:
receiving attribute information marked by a user on the voiceprint model, wherein the attribute information including at least one of gender, age and ethnicity of the target user.

14. The computer device according to claim 8, wherein the step of extracting a plurality of speech acoustic features of the framed speech signal comprises:
identifying a speech content of the framed speech signal;
determining a sounding part of the speech content;
splitting the speech signal based on the sounding part; and
extracting a plurality of speech acoustic features from the split speech signal separately.

15. A non-transitory computer readable storage medium storing computer readable instructions, wherein a method for establishing a voiceprint model is implemented when the computer readable instructions is executed by a processor, and the method for establishing a voiceprint model comprises:
framing an input speech signal of a target user, and separately extracting a plurality of speech acoustic features of the framed speech signal;
inputting the plurality of speech acoustic features into a deep learning model that is based on neural network training, and collecting the plurality of speech acoustic features to form at least one cluster structure;
calculating an average value and a standard deviation of at least one of the cluster structure;
performing coordinate transformation and activation function calculation on the average value and the standard deviation to obtain a feature vector; and
inputting the feature vector and an identity verification result of the target user into a preset basic model to obtain a voiceprint model corresponding to the target user, wherein the voiceprint model is used to verify whether an input speech signal belongs to the target user.

16. The non-transitory computer readable storage medium according to claim 15, wherein the deep learning model comprises a plurality of model layers, and the step of inputting the plurality of speech acoustic features into a deep learning model that is based on neural network training, and collecting the plurality of speech acoustic features to form at least one cluster structure comprises:
inputting the plurality of speech acoustic features into the deep learning model;
selecting any time node t of the plurality of speech acoustic features, and establishing a n-th model layer with the plurality of speech acoustic features in every to time from the time node t, wherein n is a positive integer; and
selecting a target model layer in the plurality of model layers and obtaining at least one cluster structure generated at the target model layer.

17. The non-transitory computer readable storage medium according to claim 15, wherein the step of inputting the feature vector and an identity verification result of the target user into a preset basic model to obtain a voiceprint model corresponding to the target user comprises:

reducing dimensions of the feature vector of the voiceprint model; and inputting the dimension-reduced feature vector and the identity verification result of the target user into the preset basic model to obtain the voiceprint model.

18. The non-transitory computer readable storage medium according to claim 15, wherein the step of extracting the plurality of speech acoustic features of the framed speech signal comprises:

performing fast Fourier transform on the framed speech signal to obtain an energy spectrum;

inputting the energy spectrum into a Mel-scaled triangular filter bank to output a plurality of formant features; and performing discrete cosine transform on the formant features to obtain the plurality of speech acoustic features.

19. The non-transitory computer readable storage medium according to claim 15, wherein after the step of obtaining a voiceprint model, the method comprises:

inputting a speech signal to be verified into the voiceprint model to obtain an identity verification result.

20. The non-transitory computer readable storage medium according to claim 15, wherein after the step of obtaining a voiceprint model, the method comprises:

receiving attribute information marked by a user on the voiceprint model, wherein the attribute information including at least one of gender, age and ethnicity of the target user.

* * * * *